United States Patent [19]

Uehara et al.

[11] Patent Number: 5,169,899
[45] Date of Patent: Dec. 8, 1992

[54] THERMOPLASTIC RESIN COMPOSITION

[75] Inventors: Shotaro Uehara, Yokohama; Hodaka Mizuno, Yokkaichi; Seiichi Atomori, Kuwana; Tateki Furuyama; Akira Kamiya, both of Yokkaichi, all of Japan

[73] Assignee: Japan Synthetic Rubber Co., Ltd., Tokyo, Japan

[21] Appl. No.: 404,073

[22] Filed: Sep. 7, 1989

[30] Foreign Application Priority Data

Sep. 7, 1988 [JP] Japan .................. 63-222392
Sep. 16, 1988 [JP] Japan .................. 63-229751

[51] Int. Cl.$^5$ ............................................ C08L 77/12
[52] U.S. Cl. ........................................ 525/66; 525/131;
525/166; 525/167; 525/179; 525/127
[58] Field of Search ............... 525/66, 179, 166, 167,
525/131, 127

[56] References Cited

U.S. PATENT DOCUMENTS

| 4,740,552 | 5/1988 | Grant et al. | 525/66 |
| 4,871,804 | 10/1989 | Murabayashi | 525/92 |

FOREIGN PATENT DOCUMENTS

| 60-23435 | 2/1985 | Japan . | |
| 63-227648 | 9/1987 | Japan . | |
| 3095251 | 4/1988 | Japan | 525/66 |
| 1-163251 | 6/1989 | Japan | 525/66 |

OTHER PUBLICATIONS

Patent Abstracts of Japan, vol. 12, No. 410 Oct. 28, 1988.

Patent Abstracts of Japan, vol. 11, No. 96, Mar. 26, 1987.

Primary Examiner—Ana L. Carrillo
Attorney, Agent, or Firm—Oblon, Spivak, McClelland, Maier & Neustadt

[57] ABSTRACT

A thermoplastic resin composition comprising
(A) 1–90% by weight of a polyamide elastomer and
(B) 99–10% by weight of at least one of the following (a) and (b):
  (a) a rubber-modified thermoplastic styrene resin consisting of a rubber-modified styrene polymer containing a hydroxyl group-containing alkenyl monomer as a copolymerized component or a mixture of rubber-modified styrene polymer with a styrene polymer, in which mixture at least one of these polymers contains a hydroxyl group-containing alkenyl monomer as a copolymerized component,
  (b) a mixture or reaction product of (1) 40–99% by weight of a thermoplastic polyurethane with (2) 60–1% by weight of a functional group-containing styrene resin in which a styrene resin is copolymerized with an unsaturated compound having at least one functional group selected from the group consisting of a carboxyl group, an acid anhydride group, an amino group, an epoxy group and a hydroxyl group.

The above thermoplastic resin composition has a permanent antistatic property and is superior in mechanical properties, heat resistance during molding, moldability and surface appearance.

5 Claims, No Drawings

THERMOPLASTIC RESIN COMPOSITION

This invention relates to a thermoplastic resin composition superior in mechanical properties, moldability, permanent antistatic property, heat resistance during molding and surface appearance.

Synthetic polymer materials are in use in extensive fields because of their excellent properties; however, generally, they have a high electric resistivity and are easily electrified, and hence, various inconveniences are caused by static electricity. In order to endow synthetic polymer materials with an antistatic property, it has generally been conducted to (1) knead into a synthetic polymer a water-absorbent compound (e.g. polyalkylene oxide), an antistatic agent or the like, or (2) coat the surface of a synthetic polymer with a surfactant or the like. However, no sufficient antistatic property has been imparted by any of these methods. That is, the antistatic property of the synthetic polymer thus treated is lost by water-washing or surface-wiping or the compound incorporated is bled out by water-washing or surface-wiping, resulting in quality deterioration, whereby the quality of the synthetic polymer is deteriorated and the anti-static property thereof is deteriorated with the lapse of time.

Meanwhile, it is known that so-called polyetheresteramides in which a polyamide and a polyester are ester-bonded via a dicarboxylic acid have an excellent rubber elasticity and a good antistatic property. However, the polyetheresteramides have a rubber elasticity and insufficient mechanical strengths, and consequently, are not satisfactory as structural materials in which rigidity and high toughness are required. Moreover, the polyetheresteramides have poor compatibility with other thermoplastic resins, for example, vinyl polymers such as polystyrene, styrene-acrylonitrile copolymer (AS resin), polymethyl methacrylate, styrene-methyl methacrylate copolymer, acrylonitrile-butadienestyrene terpolymer (ABS resin) and the like. Hence, for example, Japanese Patent Application Kokai No. 61-246244 (hereinafter referred to as "Prior Art 1") discloses that a composition consisting of (I) a polyetheresteramide, (II) a graft copolymer obtained by graft polymerizing a (meth)acrylic acid ester and/or an aromatic vinyl compound onto a rubbery polymer and (III) a copolymer (a styrene polymer) obtained by copolymerizing a mixture of a (meth)acrylic acid ester and an aromatic vinyl compound and/or a vinyl cyanide has a permanent antistatic property.

The composition of Prior Art 1, however, is not satisfactory in mechanical strengths such as impact strength and the like because the compatibility between the polyetheresteramide and the styrene copolymer is still poor, and accordingly the composition cannot be used in practice.

Japanese Patent Application Kokai No. 60-3435 (hereinafter referred to as "Prior Art 2") discloses blending a polyetheresteramide with a carboxyl group-containing modified vinyl polymer. However, the composition of Prior Art 2 have improved mechanical strength but exhibits poor appearance in respect of silver streaks, delustering and the like. Moreover, the composition of Prior Art 2, when allowed to reside during molding, not only is the above-mentioned poor appearance exhibited, but also the mechanical strength is lowered and the heat stability becomes inferior.

An object of this invention is to solve the above-mentioned problems of the prior art and provide a thermoplastic resin composition superior in heat stability during molding, moldability and permanent antistatic property.

According to this invention, there is provided a thermoplastic resin composition comprising (A) 1-90% by weight of a polyamide elastomer and (B) 99-10% by weight of at least one of the following (a) and (b):

(a) a rubber-modified thermoplastic styrene resin consisting of a rubber-modified styrene polymer containing a hydroxyl group-containing alkenyl monomer as a copolymerized component or a mixture of a rubber-modified styrene polymer and a styrene polymer, in which mixture at least one of these polymers contains a hydroxyl group-containing alkenyl monomer as a copolymerized component, (b) a mixture or reaction product of (1) 40-99% by weight of a thermoplastic polyurethane and (2) 60-1% by weight of a functional group-containing styrene resin in which a styrene resin is copolymerized with an unsaturated compound having at least one functional group selected from the group consisting of a carboxyl group, an acid anhydride group, an amino group, an epoxy group and a hydroxyl group.

An example of the polyamide elastomer (A) used in this invention is an elastomer composed of a hard segment (X) which is an aminocarboxylic acid or lactam having 6 or more carbon atoms or a nylon mn salt in which $m+n$ is 12 or more and a soft segment (Y) which is a polyol, specifically a poly(alkylene oxide)glycol, in which elastomer the proportion of the (X) component is 10-95% by weight, preferably 20-90% by weight, more preferably 80-90% by weight.

when the proportion of the (X) segment in the polyamide elastomer (A) is less than 10% by weight, the polyamide elastomer has poor compatibility with the component (B). When the proportion is more than 95% by weight, the polyamide elastomer is inferior in antistatic property.

The (X) segment, i.e. the aminocarboxylic acid or lactam having 6 or more carbon atoms and the nylon mn salt in which $m+n$ is 12 or more include aminocarboxylic acids such as $\omega$-aminocaproic acid, $\omega$-aminoenanthic acid, $\omega$-aminocaprylic acid, $\omega$-aminopelargonic acid, $\omega$-aminocapric acid, 11-aminoundecanoic acid, 12-aminododecanoic acid and the like; lactams such as caprolactam, laurolactam and the like; and nylon salts such as nylon 6,6, nylon 6,10, nylon 6,12, nylon 11,6, nylon 11,10, nylon 12,6, nylon 11,12, nylon 12,10, nylon 12,12 and the like.

The (Y) segment, i.e. the poly(alkylene oxide)glycol includes poly(ethylene oxide)glycol, poly(1,2-or 1,3-propylene oxide)glycol, poy(tetramethylene oxide)glycol, poly(hexamethylene oxide)glycol, an ethylene oxide-proplene oxide block or random copolymer, an ethylene oxide-tetrahydrofuran block or random copolymer, etc. Of these poly(alkylene oxide)glycols (Y), poly(ethylene oxide)glycol is particularly preferable because of its excellent antistatic property.

The number-average molecular weight of the poly(alkylene oxide)glycol (Y) is preferably 200-6,000, more preferably 250-4,000.

In this invention, the terminals of the poly(alkylene oxide)glycol (Y) may be aminated or carboxylated.

As the bond between the (X) component and the (Y) component, an ester bond or an amide bond is possible depending upon the terminal groups of the polyamide elastomer (A).

In bonding the (X) component to the (Y) component, a third component (Z) such as a dicarboxylic acid, a diamine or the like can be used.

The dicarboxylic acid is such as to have 4–20 carbon atoms and includes, for example, aromatic dicarboxylic acids such as terephthalic acid, isophthalic acid, naphthalene-2,6-dicarboxylic acid, naphthalene-2,7-dicarboxylic acid, diphenyl-4,4-dicarboxylic acid, diphenoxyethanedicarboxylic acid, sodium 3-sulfoisophthalate and the like; alicyclic dicarboxylic acids such as 1,4-cyclohexanedicarboxylic acid, 1,2-cyclohexanedicarboxylic acid, dicyclohexyl-4,4-dicarboxylic acid and the like; aliphatic dicarboxylic acids such as succinic acid, oxalic acid, adipic acid, sebacic acid, dodecanedicarboxylic acid and the like; and their mixtures. Of these, terephthalic acid, isophthalic acid, 1,4-cyclohexanedicarboxylic acid, sebacic acid, adipic acid and dodecanedicarboxylic acid are particularly preferable in view of polymerizability, color and physical properties.

The diamine includes aromatic, alicyclic and aliphatic diamines. An example of the aliphatic diamines is hexamethylenediamine.

The method of the synthesis of the polyamide elastomer (A) is not critical and may be, for example, the method disclosed in Japanese Patent Application Kokoku No. 56-45419, Japanese Patent Application Kokai No. 55-133424 or the like.

When there is used, as the polyamide elastomer (A), a polyetheresteramide composed of (X') an aminocarboxylic acid or lactam having 6 or more carbon atoms or a nylon mn salt in which m +n is 12 or more, (Y') a poly(ethylene oxide)glycol having a number-average molecular weight of 200–6,000 and (Z') a dicarboxylic acid having 4–20 carbon atoms, in which polyetheresteramide the polyetherester unit is contained in an amount of 5–90% by weight, the resulting thermoplastic resin composition has a very high antistatic property.

The (X') component is preferably caprolactam, 12-aminododecanoic acid or nylon 6,6.

The (Y') component is preferably a poly(ethylene oxide)glycol having a number-average molecular weight of 250–4,000. When there is used a poly(ethylene oxide)glycol having a number-average molecular weight falling within the above range, the resulting thermoplastic resin composition is superior in mechanical properties and antistatic property.

The (Z') component is preferably terephthalic acid, isophthalic acid, 1,4-cyclohexanedicarboxylic acid, sebacic acid, adipic acid or dodecanoic acid. When one of these dicarboxylic acids is used, the resulting polyamide elastomer is superior in polymerizability and color.

The rubber-modified thermoplastic styrene resin (B)(a) used in the composition of this invention is (a-1) a rubber-modified styrene polymer containing a hydroxyl group-containing alkenyl monomer as a copolymerized component or (a-2) a mixture of a rubber-modified styrene polymer and a rubber-unmodified styrene polymer, at least one of which contains a hydroxyl group-containing alkenyl monomer as a copolymerized component. This mixture is obtained by mixing a rubbery polymer with a specific styrene polymer in order to obtain a high impact resistance. The mixing may be effected by simple mechanical blending. In order to assure good compatibility, however, a so-called graft copolymerization is more preferable in which the styrene monomer is copolymerized in the presence of the rubbery polymer. It is also preferable to use a mixture obtained by a so-called graft-blending method in which a rubber-modified styrene polymer (graft copolymer) obtained by the above graft copolymerization is blended with a styrene polymer obtained by a separate method.

The rubbery polymer includes diene rubbers (e.g. polybutadiene, styrene-butadiene copolymer), acrylic copolymers, ethylene-propylene-(diene) copolymers, chlorinated polyethylene, polyurethane, etc. Of these, polybutadiene is preferable.

The rubber-modified thermoplastic styrene resin (B)(a) used in the composition of this invention contains a hydroxyl group-containing alkenyl monomer as a copolymerized component. In the case of (a-1), the rubber-modified styrene polymer contains a hydroxyl group-containing alkenyl monomer in the copolymerized form. In the case of (a-2), namely the mixture, at least one of the rubber-modified styrene polymer and the styrene polymer contains a hydroxyl group-containing alkenyl monomer in the copolymerized forms.

The styrene monomer constituting the styrene polymer includes styrene, $\alpha$-methylstyrene, bromostyrene, etc. Of these, styrene is most preferable.

The hydroxyl group-containing alkenyl monomer is a compound having at least one unsaturation (double bond or triple bond) and at least one hydroxyl group. Typical examples of such a compound are alcohols having a double bond, alcohols having a triple bond, esters of an unsaturated mono- or di-carboxylic acid with an unsubstituted dihydric alcohol, esters of an unsaturated mono- or di-carboxylic acid with an unsubstituted trihydric alcohol, esters of an unsaturated mono- or di-carboxylic acid with an unsubstituted tetrahydric alcohol and esters of an unsaturated mono- or di-carboxylic acid with an unsubstituted pentahydric or more hydric alcohol.

Preferable examples of the hydroxyl group-containing alkenyl monomer used in this invention are -hydroxy-1-propane, 4-hydroxy-1-butene, cis-4-hydroxy-butene, trans-4-hydroxy-2-butene, 3-hydroxy-2-methyl-1-propene, cis-5-hydroxy-2-pentene, trans-5-hydroxy-2-pentene, cis-1,4-dihydroxy-2-butene, trans-1,4-dihydroxy-2-butene, 2-hydroxyethyl acrylate, 2-hydroxyethyl methacrylate, 3-hydroxypropyl acrylate, -hydroxypropyl methacrylate, 2-hydroxyethyl crotonate, 2,3,4,5,6-pentahydroxyhexyl acrylate, 2,3,4,5,6-pentahydroxyhexyl methacrylate, 2,3,4,5-tetrahydroxypentyl acrylate, 2,3,4,5-tetrahydroxypentyl methacrylate, etc.

Of these, 2-hydroxyethyl methacrylate is most preferable.

These hydroxyl group-containing alkenyl monomers can be used alone or in combination of two or more.

The content of the hydroxyl group-containing alkenyl monomer is 0.01–15% by weight, preferably 0.1–5% by weight, more preferably 0.1–2% by weight, particularly preferably more than 0.1% by weight and less than 0.5% by weight, based on the total weight of the rubber-modified thermoplastic styrene resin (B)(a) and the polyamide elastomer (A). When the content of the hydroxyl group-containing alkenyl monomer is less than 0.01% by weight of the total weight of (A) and (B), the rubber-modified thermoplastic styrene resin (B)(a) has low compatibility with the polyamide elastomer (A), resulting in low impact resistance and low antistatic property. When the content is more than 15% by weight, the resulting composition has a reduced heat stability during molding as well as a reduced moldability. When the content of the hydroxyl group-containing alkenyl monomer is 0.1-2% by weight, preferably more than 0.1% by weight and less than 0.5% by weight, of the total weight of (A) and (B), the resulting composition has a better balance in respect of heat stability during molding, moldability, antistatic property and impact resistance.

In addition to the hydroxyl group-containing alkenyl monomer, it is also possible to optionally copolymerize other monomers copolymerizable with the styrene monomer. Such other monomer includes acrylonitrile, methacrylonitrile, methyl methacrylate, N-phenylmaleimide, N-cyclohexylmaleimide, etc.

When the styrene monomer is used alone in the preparation of the rubber-modified thermoplastic styrene resin (B)(a), the impact resistance becomes poor. Therefore, it is preferable to copolymerize acrylonitrile with the styrene monomer.

When the rubber-modified thermoplastic styrene resin (B)(a) contains a hydroxyl group-containing alkenyl monomer in the form of a graft copolymer, the trunk onto which the alkenyl monomer is to be grafted can be, for example, (i) a rubbery polymer, (ii) the graft layer of a graft copolymer or (iii) a non-grafted styrene polymer. Of these, (ii) and (iii) are preferable, and (iii) is particularly preferable.

The rubber-modified thermoplastic styrene resin (B)(a) can be obtained specifically by substituting the hydroxyl group-containing alkenyl monomer for a part of the monomers to be copolymerized in the preparation of a conventional styrene copolymer resin such as acrylonitrile-butadiene-styrene resin (ABS resin), acrylonitrile-ethylene-propylene-styrene resin (AES resin), methyl methacrylate-butadiene-styrene resin (MBS resin), acrylonitrile-butadiene-methyl methacrylate-styrene resin, acrylonitrile-n-butyl acrylate-styrene resin (AAS resin), rubber-modified polystyrene [high impact polystyrene (HIPS)], a heat-resistant rubber-modified styrene resin using α-methylstyrene, or the like, or substituting the hydroxyl group-containing alkenyl monomer for a part of the monomers to be copolymerized in the preparation of the styrene resin to be mixed with said styrene copolymer resin.

Of the thus obtained rubber-modified thermoplastic styrene resins (B)(a), most preferable is an ABS resin containing a hydroxyl group-containing alkenyl monomer as a copolymerized component.

The rubber-modified thermoplastic styrene resin (B)(a) used in this invention can be produced by emulsion polymerization, solution polymerization, suspension polymerization or the like.

A polymerization initiator, a molecular weight modifier, an emulsifier, a dispersing agent, a solvent and the like may be used in the above production, and they may be those which are usually used in the above polymerization methods.

The preferable process for producing a rubber-modified thermoplastic styrene resin (B)(a) comprises mixing (1) a graft copolymer obtained by graft-copolymerizing, in the presence of the rubbery polymer obtained by emulsion polymerization, the monomers using an emulsifier and a polymerization initiator, generally at a temperature of 30°-150° C. for 1-15 hours at a pressure of 1.0-5.0 kg/cm$^2$, provided that the graft copolymer comprises a non-grafted styrene polymer, with (2) a styrene polymer obtained by emulsion polymerization or solution polymerization.

Next, the thermoplastic polyurethane (B)(b)(1) used in this invention is obtained by uniformly mixing (P) a high molecular compound having a number-average molecular weight of 500-2,000 and two or more hydroxyl groups, (Q) a compound having two or more active hydrogen atoms and a molecular weight of 500 or more and capable of reacting with isocyanate group, and (R) an organic diisocyanate at equivalent ratios of (P) : (Q)=1:0.2-4 and [P) +(Q) : (R) =1.0 : 0.75-1.3 and then reacting them with heating.

If necessary, a thermoplastic polyurethane consisting of only the components (P) and (R) may be used.

As the high molecular compound (P) having two or more hydroxyl groups, there can be used polyester glycols obtained by, for example, condensation between a saturated aliphatic glycol having 2-8 carbon atoms and a saturated aliphatic dicarboxylic acid having 4-10 carbon atoms or an aromatic dicarboxylic acid, or copolymerization of an alkylene glycol with a lactone group.

As the high molecular compound (P), there can also be similarly used poly(alkylene oxide)glycols obtained by, for example, condensation of alkylene oxides having 2-4 carbon atoms, condensation of an alkylene oxide and an alkylene glycol or ring-opening polymerization of tetrahydrofuran; dihydroxypolyesteramides; dihydroxypolyacetals; and dihydroxypolyalkylenes. Particularly preferable are dihydroxypolyethylene adipate, dihydroxypolybutylene adipate, poly(tetramethylene oxide)glycol, etc.

The compound (Q) having a molecular weight of 500 or less and at least two active hydrogen atoms and capable of reacting with isocyanate group is a saturated aliphatic glycol having 2-6 carbon atoms, an alicyclic glycol such as 1,4-cyclohexylene glycol or the like, or an aromatic glycol such as 1,4-xylylene glycol, phenylene bis-(β-hydroxyethyl ether) and the like. These compounds can be used alone or in combination of two or more. A small amount of water or a trihydric alcohol (e.g. trimethylolpropane, hexanetriol, glycerine) may be used together with the above glycols.

The organic diisocyanate (R) may be any organic diisocyanate which is usually used in the production of polyurethane resin, and includes, for example, 2,4-tolylene diisocyanate, 2,6-tolylene diisocyanate, phenylene diisocyanate, 4,4'-diphenylmethane diisocyanate, 4,4'-diphenylethane diisocyanate, 1,5-naphthylene diisocyanate, 3,3'-dimethylbiphenyl-4,4'-diisocyanate, 3,3'-dimethylbiphenyl-4,4'-diisocyanate, o-, m- or p-xylylene diisocyanate, tetramethylene diisocyanate, hexamethylene diisocyanate, 4,4'-dicyclohexylmethane diisocyanate, other similar diisocyanates and their dimers. They can be used alone or in admixture of two or more. Of these organic diisocyanates, 4,4'-diphenylmethane diisocyanate is particularly preferable.

The functional group-containing styrene resin used as the (B)(b)(2) component in this invention is obtained by copolymerizing a conventional styrene resin with a compound having at least one functional group selected from the group consisting of carboxyl group, acid anhydride group, amino group, epoxy group and hydroxyl group.

The (B)(b) component of this invention is a combination of (1) the thermoplastic polyurethane and (2) the functional group-containing styrene resin. This combination may further incorporate a conventional styrene resin.

In the present specification, the styrene resin implies a resin obtained by copolymerizing, in the presence or absence of a rubbery polymer, resin-forming monomers consisting of an aromatic alkenyl compound, an alkenyl cyanide compound and, if necessary, other alkenyl monomers copolymerizable therewith.

The rubbery polymer includes, for example, copolymers of ethylene and an o-olefin, such as ethylene-propylene random or block copolymer, ethylene-butene random or block copolymer and the like; copolymers of ethylene and an unsaturated carboxylic acid ester, such as ethylene-methacrylate copolymer, ethylene-butyl acrylate copolymer and the like; copolymers of ethylene and a vinyl fatty acid ester, such as ethylene-vinyl acetate copolymer and the like; ethylene-propylene-nonconjugated diene terpolymers such as ethylenepropylene-ethylidenenorbornene terpolymer, ethylene-propylene-hexadiene terpolymer and the like; diene rubbers such as polybutadiene, polyisoprene, styrene-butadiene random or block copolymer, acrylonitrile-butadiene copolymer, butadiene-isoprene copolymer and the like; and butylene-isoprene copolymer. They can be used alone or in combination of two or more.

Of these rubbery polymers, an ethylene-propylene rubber, an ethylene-propylene-nonconjugated diene terpolymer and a diene rubber are preferred, and a polybutadiene and a styrene-butadiene copolymer are more preferable in view of impact resistance. The styrene content in the styrene-butadiene copolymer is desirably 50% by weight or less.

The rubbery polymer content in the styrene resin is preferably 3-35% by weight, more preferably 5-35% by weight, particularly preferably 5-33% by weight. The rubbery polymer content of less than 3% by weight gives poor impact resistance, and the rubbery polymer content of more than 35% by weight gives poor moldability and high heat-shrinkage percentage.

The aromatic alkenyl compound includes styrene, α-methylstyrene, methylstyrene, vinylxylene, monochlorostyrene, dichlorostyrene, monobromostyrene, dibromostyrene, p-t-butylstyrene, ethylstyrene, vinylnaphthalene, o-methylstyrene, dimethylstyrene, etc. These compounds can be used alone or in combination of two or more. Of these, styrene is preferable. When two or more aromatic alkenyl compounds are used, it is preferable that they contain styrene in an amount of 50% by weight or more.

The alkenyl cyanide compound includes acrylonitrile, methacrylonitrile, etc. Acrylonitrile is preferred.

Said other alkenyl compound copolymerizable with the aromatic alkenyl compound and the alkenyl cyanide compound includes, for example, alkyl acrylates such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate and the like; aryl acrylates such as phenyl acrylate, benzyl acrylate and the like; alkyl methacrylates such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate and the like; aryl methacrylates such as phenyl methacrylate, benzyl methacrylate and the like; and maleimide compounds such as maleimide, N-methylmaleimide, N-ethylmaleimide, N-phenylmaleimide, N-o-chlorophenylmaleimide, N-cyclohexylmaleimide and the like.

These copolymerizable alkenyl compounds can be used alone or in combination of two or more.

These copolymerizable alkenyl compounds are used in an amount of preferably 50% by weight or less, more preferably 20% by weight or less, based on the weight of the styrene resin component.

The styrene resin may be a mixture of (1) a resin obtained by polymerizing resin-forming monomers in the presence of the above-mentioned rubbery polymer, with (2) a resin obtained by polymerizing resin-forming monomers in the absence of the rubbery polymer (hereinafter, the mixture is referred to as "aromatic alkenyl copolymer" in some cases).

Specific examples of the styrene resin include an acrylonitrile-butadiene rubber-styrene resin (ABS resin), an acrylonitrile-ethylene-propylene rubber-styrene resin (AES resin), an acrylonitrile-butadiene rubber-methyl methacrylate-styrene resin (ABSM resin), an acrylonitrile-styrene copolymer (AS resin), a high impact polystyrene (HIPS) and an acrylonitrile-n-butyl acrylate rubber-styrene resin (AAS resin).

The styrene resin used in this invention can be produced by emulsion-, solution- or suspension-polymerizing the above-mentioned monomers in the presence or absence of the above-mentioned rubbery polymer.

A polymerization initiator, a molecular weight modifier, an emulsifier, a dispersing agent, a solvent and the like may be used in the above polymerization and they may be those which are ordinarily used in such polymerization.

The preferable process for producing the styrene resin comprises mixing (1) a graft copolymer obtained by graft-copolymerizing, in the presence of a rubbery polymer obtained by emulsion-polymerization, the monomers using an emulsifier and a polymerization initiator, generally at a temperature of 30°-150° C. for 1-15 hours at a pressure of 1.0-5.0 kg/cm² (the graft copolymer includes a non-grafted styrene polymer), with (2) a styrene polymer obtained by emulsion polymerization or solution polymerization.

The functional group-containing unsaturated compound to be copolymerized with the styrene resin includes, as carboxyl group-containing unsaturated compound, for example, acrylic acid, mathacrylic acid, crotonic acid, cinnamic acid, itaconic acid, maleic acid and the like. Acrylic acid and methacrylic acid are preferred. These compounds can be used alone or in combination of two or more.

The acid anhydride group-containing unsaturated compound constituting the functional group-containing styrene resin (B)(b)(2) includes maleic anhydride, itaconic anhydride, chloromaleic anhydride, citraconic anhydride, butenylsuccinic anhydride, tetrahydrophthalic anhydride, etc. Of these, maleic anhydride is preferable. These compounds can be used alone or in combination of two or more.

The amino group-containing unsaturated compound constituting the functional group-containing styrene resin (B)(b)(2) is an alkenyl monomer having at least one amino or substituted amino group represented by the following formula:

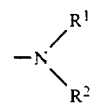

wherein $R^1$ is a hydrogen atom, a methyl group or an ethyl group and $R^2$ is a hydrogen atom, an alkyl group having 1-12 carbon atoms, an alkanoyl group having 2-12 carbon atoms, a phenyl group having 6-12 carbon atoms, a cycloalkyl group having 6-12 carbon atoms or a derivative thereof. The amino group-containing unsaturated compound includes, for example, derivatives of alkyl acrylates and methacrylates, such as aminoethyl acrylate, propylaminoethyl acrylate, dimethylaminoethyl methacrylate, aminopropyl methacrylate, phenylaminoethyl methacrylate, cyclohexylaminoethyl methacrylate and the like; derivatives of vinylamine such as N-vinyldiethylamine, N-acetylvinylamine and the like; derivatives of allylamine such as allylamine, N-methylallylamine and the like; derivatives of acrylamide such as acrylamide, N-methylacrylamide and the like; and aminostyrene such as p-aminostyrene and the like.

Of these, allylamine, aminoethyl methacrylate, aminopropyl methacrylate and aminostyrene are particularly preferable because they are economically available on a commercial scale.

These amino or substituted amino group-containing unsaturated compounds can be used alone or in combination of two or more.

The epoxy group-containing unsaturated compound constituting the functional group-containing styrene resin (B)(b)(2) is a compound having, in the molecule, an epoxy group and an unsaturation copolmyerizable with an olefin or an ethylenically unsaturated compound.

Specific examples of the epoxy group-containing unsaturated compound are glycidyl acrylate, glycidyl methacrylate, glycidyl itaconate, glycidyl butenecarboxylate, allyl glycidyl ether, 2-methylallyl glycidyl ether, styrene-p-glycidyl ether, 3,4-epoxybutene, 3,4-epoxy-3-methyl-1-butene, 3,4-epoxy-1-pentene, 3,4-epoxy-3-methylpentene, 5,6-epoxy-1-hexene, vinylcyclohexene monooxide and p-glycidylstyrene. These epoxy group-containing unsaturated compounds can be used alone or in combination of two or more.

The hydroxyl group-containing unsaturated compound constituting the functional group-containing styrene resin (B)(b)(2) includes the same hydroxyl group-containing alkenyl compounds as used in the (B)(a) component.

The hydroxyl group-containing unsaturated compound can be used alone or in combination of two or more.

The amount of the functional group-containing unsaturated compound used is 0.01-15% by weight, preferably 0.05-10% by weight, more preferably 0.1-5% by weight, based on the weight of the thermoplastic resin composition of this invention.

When the amount of the functional group-containing unsaturated compound is less than 0.01% by weight, the resulting (B) component has low compatibility with the polyamide elastomer (A) and consequently the final thermoplastic resin composition has low impact resistance and low antistatic property. When the amount is more than 15% by weight, the composition obtained has low heat stability during molding and low moldability.

The base material used when the functional group-containing unsaturated compound is copolymerized with the styrene resin to form a functional group-containing styrene resin (B)(b)(2), is (1) a rubbery polymer, (2) the graft layer of a graft copolymer or (3) a non-grafted styrene polymer. Of these, (2) or (3) is preferable.

The functional group-containing styrene resin can be produced by substituting the above-mentioned functional group-containing unsaturated compound for a part of the monomers in the production of a conventional styrene resin such as acrylonitrile-butadiene-styrene resin (ABS resin), acrylonitrile-ethylene-propylene-styrene resin (AES resin), methyl methacrylate-butadiene-styrene resin (MBS resin), acrylonitrile-butadiene-methyl methacrylate-styrene resin, acrylonitrile-n-butyl acrylate-styrene resin (AAS resin), rubber-modified polystyrene (high-impact polystyrene, HIPS), acrylonitrile-styrene resin (AS resin), methyl methacrylate-styrene resin (MS resin) or the like.

The most preferable functional group-containing styrene resin is a resin obtained by copolymerizing a carboxyl group- or acid anhydride group-containing unsaturated compound with ABS resin-forming components.

The thermoplastic resin composition of this invention comprises, as the main components, (A) a polyamide elastomer and (B)(a) a hydroxyl group-containing rubber-modified thermoplastic styrene resin and/or (b)(1) a thermoplastic polyurethane and (2) a functional group-containing styrene resin. The proportion of the (A) component is 1-90% by weight, preferably 5-60% by weight, more preferably 7-40% by weight and the proportion of the (B) component is 10-99% by weight, preferably 0-95% by weight, more preferably 60-93% by weight.

When the proportion of the polyamide elastomer (A) is less than 1% by weight, the resulting thermoplastic resin composition is insufficient in moldability, antistatic property and impact strength. When the proportion is more than 90% by weight, the composition is flexible and has poor mechanical properties.

When the thermoplastic resin composition of this invention comprises the (A) component and the (B) component, the compounding proportion of the polyamide elastomer (A) to the thermoplastic polyurethane (B)(b)(1) is such that the amount of the (A) component is 1-90% by weight, preferably 30-85% by weight and the amount of the (B)(b)(1) component is 99-10% by weight, preferably 70-15% by weight [(A) +(B)(b)(1) =100% by weight].

The compounding proportion of the total amount of [(A) +(B)(b)(1)]to the aromatic alkenyl copolymer containing the functional group-containing styrene resin (B)(b)(2) is such that the amount of the (A) component plus the (B)(b)(1) component is 1-90% by weight, preferably 5-30% by weight and the amount of the (B)(b)(2) component is 99-10% by weight, preferably 95-70% by weight. When the total amount of (A) and (B)(b)(1) is less than 1% by weight, the resulting composition has low antistatic property. When the total amount is more than 90% by weight, the composition is flexible and has poor mechanical properties.

The composition of this invention can further comprise (C) a styrene resin, in addition to the (A) and (B) components, when the (B) component consists of the (B)(b) component.

The styrene resin (C) is the same as mentioned in the (B)(b) component.

When the present thermoplastic resin composition comprises the (A) component, the (B)(b) component and the (C) component, the preferable amounts of these components compounded are as follows:

The compounding proportion of the polyamide elastomer (A) to the styrene resin (C) is such that the amount of the (A) component is 1-90% by weight, preferably 5-30% by weight and the amount of the (C) component is 99-10% by weight, preferably 95-70% by weight [(A) +(C) =100% by weight]. When the amount of the (A) component is less than 1% by weight, the resulting composition has insufficient antistatic property. When the amount of the (A) component is more than 90% by weight, the composition is flexible.

The compounding proportion of the thermoplastic polyurethane (B)(b)(1) to the functional group-containing styrene resin (B)(b)(2) is such that the amount of the (B)(b)(1) component is 40-99% by weight, preferably 50-90% by weight and the amount of the (B)(b)(2) component is 60-1% by weight, preferably 50-10% by weight [(B)(b)(1) +(B)(b)(2) =100% by weight]. When the amount of the (B)(b)(1) component is less than 40% by weight, the resulting composition has poor impact strength. When the amount of the (B)(b)(1) component is more than 99% by weight, the compatibility between the polyamide elastomer (A) and the styrene resin (C) is poor and the resulting composition is inferior in mechanical properties (e.g. impact strength).

The proportion of the (B)(b) component in the present composition containing the (C) component is 0.1-50 parts by weight, preferably 1-30 parts by weight, per 100 parts by weight of [(A) +(C)]. When the proportion is less than 0.1 part by weight, the compatibility between the polyamide elastomer (A) and the styrene resin (C) is poor and the resulting composition is inferior in mechanical properties (e.g. impact strength). When the proportion is more than 50 parts by weight, the composition is flexible and has inferior mechanical properties.

The thermoplastic resin composition of this invention can be obtained by mixing the (A) component, the (B) component and, if necessary, the (C) component by a conventional method. For example, these components are mixed by a mixer, and melt kneaded at 200°-280° C. and pelletized by an extruder. Simply, these components are melt kneaded in a molding machine to obtain a molded article in one step.

When the (B)(b) component is used as the (B) component, the thermoplastic polyurethane (B)(b)(1) and the functional group-containing styrene resin (B)(b)(2) are reacted with each other with melt-kneading to obtain a reaction product; the reaction product is then mixed with the polyamide elastomer (A) and, if necessary, the styrene resin (C) by an ordinary method, thereby a composition with excellent physical properties can be obtained.

The melt-kneading of the (B)(b)(1) component and the (B)(b)(2) component to react them, thereby obtaining a reaction product can be effected by, for example, mixing the components by a mixer and melt-kneading them at 180°-250° C. by an extruder. Simply, all the components are melt-kneaded in a molding machine to obtain a molded article in one step. In other melt-kneading methods, a styrene resin and a thermoplastic polyurethane are melt-kneaded in the presence of a functional group-containing unsaturated compound. In these melt-kneading methods, an organic peroxide may be used.

The composition of this invention comprises (A) and (B) as the main components. The composition can further comprise ordinary synthetic resins and elastomers such as vinyl chloride resin, polyolefin resin, polybutylene terephthalate, polyethylene terephthalate, polycarbonate, polyphenylene ether, styrene elastomer, polyester elastomer, polyamide, polysulfone, polyacetal, polyphenylene sulfide, polyarylate, fluororesin, liquid crystal polymer and the like, in an amount of about 50% by weight or less.

The composition of this invention can further comprise various compounding agents.

The compounding agents include, for example, antioxidants such as 2,6-di-t-butyl-4-methylphenol, -(1-methylcyclohexyl)-4,6-dimethylphenol, 2,2-methylene-bis-(4-ethyl-6-t-butylphenol), 4,4'-thiobis-(6-t-butyl-3-methylphenol), dilaurylthio dipropionate, tris(dinonylphenyl) phosphite and the like; ultraviolet absorbers such as p-t-butylphenyl salicylate, 2,2'-dihydroxy-4-methoxybenzophenone, 2-(2'-hydroxy-4'-n-octoxyphenyl)benzotriazole and the like; lubricants such as paraffin wax, stearic acid, hardened oil, stearamide, methylene-bis(stearamide), n-butyl stearate, ketone wax, octyl alcohol, lauryl alcohol, triglyceride of hydroxystearic acid and the like; flame retardants such as antimony oxide, ammonium hydroxide, zinc borate, tricresyl phosphate, tris(dichloropropyl) phosphate, chlorinated paraffin, tetrabromobutane, hexabromobenzene, tetrabromobisphenol A and the like; antistatic agents such as stearamidopropyldimethyl-β-hydroxyethylammonium nitrate and the like; coloring agents such as titanium oxide, carbon black and the like; fillers such as calcium carbonate, clay, silica, glass fiber, glass beads, carbon fiber and the like; pigments; and the like.

The thermoplastic resin composition of this invention has an antistatic property, is superior in mechanical properties, heat resistance during molding, moldability and surface appearance, and is useful in applications such as housings for office automation equipment (these equipment has had electrostatic problems), chassis, housings for optical or magnetic media, cases for accommodating various goods, trays used in the course of electronic parts production, containers, and exterior parts for home electric appliances (some of these appliances collect dust, etc. and give poor appearance during the use).

The composition of this invention further has very high heat stability and, even when molded at high temperatures or allowed to reside during molding, gives only small reduction in impact resistance, gloss and antistatic property. Accordingly, the composition gives only small change in quality when molded under severe conditions to meet recent diversified applications, and is very useful in industry.

This invention is hereinafter explained more specifically referring to Examples. In the Examples, parts and % are by weight unless otherwise specified.

REFERENCE EXAMPLE 1

(Preparation of rubber-moldified styrene polymers G-1 and G-2)

Into a 7-liter glass flask provided with a stirrer were batchwise fed the chemicals shown in the upper column of Table 1. The air in the flask was replaced with a nitrogen gas, and the interior temperature of the flask was elevated to 40° C. while maintaining the jacket of the flask at 70° C.

Then, to the flask contents were added 0.3 part of sodium pyrophosphate dissolved in 10 parts of water, 0.35 part of dextrose, 0.01 part of ferrous sulfate and 0.1 part of cumene hydroperoxide, and polymerization was initiated.

One hour after the start of the polymerization, the incremental mixture shown in the lower column of Table 1 was added continuously over 3 hours. The polymerization were continued for a further 1 hour, whereby the polymerization was almost completed.

To the graft copolymer (rubber-modified styrene polymer) latex thus obtained was added, as an antioxidant, 1.0 part of 2,6-t-butyl-p-cresol. Then, sulfuric acid was added in a proportion of 2 parts per 100 parts of the polymer, to coagulate the latex at 90° C.

The resulting coagulum was separated, water-washed, dehydrated and dried to obtain rubber-modified styrene polymers G-1 and G-2.

TABLE 1

| Chemicals (parts) | G-1 | G-2 |
|---|---|---|
| Batchwise feed | | |
| Polybutadiene latex*1 | 32 | 32 |
| (in terms of solid content) | | |
| Styrene-butadiene copolymer latex*2 | 8 | 8 |
| (in terms of solid content) | | |
| Styrene | 14 | 12.7 |
| Acrylonitrile | 6 | 5.1 |
| 2-Hydroxyethyl acrylate | — | 2.2 |
| t-Dodecylmercaptan | 0.15 | 0.15 |
| Potassium rosinate | 0.5 | 0.5 |
| Potassium hydroxide | 0.01 | 0.01 |
| Deionized water | 100 | 100 |
| Incremental mixture | | |
| Styrene | 28 | 25.5 |
| Acrylonitrile | 12 | 10.1 |
| 2-Hydroxyethyl acrylate | — | 4.4 |
| t-Dodecylmercaptan | 0.3 | 0.3 |
| Potassium rosinate | 1.0 | 1.0 |
| Potassium hydroxide | 0.02 | 0.02 |
| Cumene hydroperoxide | 0.1 | 0.1 |
| Deionized water | 50 | 50 |

Note
*1 #0700 manufactured by Japan Synthetic Rubber Co., Ltd.
*2 #0561 manufactured by Japan Synthetic Rubber Co., Ltd.

REFERENCE EXAMPLE 2

(Preparation of styrene polymers M-1 to M-9)

In a 7-liter glass flask provided with a stirrer were placed the chemicals shown in Table 2. The air in the flask was replaced with a nitrogen gas, and the interior temperature of the flask was elevated to 50° C. while maintaining the jacket of the flask at 70° C.

Then, to the flask contents were added 0.3 part of potassium persulfate dissolved in 4 parts of water and 0.1 part of sodium sulfite dissolved in 1 part of water, and they were subjected to copolymerization for 3 hours.

To the resulting styrene polymer latex was added calcium chloride in a proportion of 2 parts per 100 parts of the polymer to coagulate the latex at 90° C. The resulting coagulum was separated, water-washed, dehydrated and dried to obtain styrene polymers M-1 to M-9 shown in Table 2.

TABLE 2

| Chemicals (parts) | M-1 | M-2 | M-3 | M-4 | M-5 | M-6 | M-7 | M-8 | M-9 |
|---|---|---|---|---|---|---|---|---|---|
| Styrene | 71.25 | 67.5 | 60 | 37.5 | 60 | 67.5 | 70.5 | 66.5 | 80 |
| Acrylonitrile | 23.75 | 22.5 | 20 | 12.5 | 20 | 22.5 | 23.5 | 19.5 | — |
| 2-Hydroxyethyl methacrylate | 5 | 10 | 20 | 50 | — | — | — | 10 | 20 |
| 2-Hydroxyporpyl methacrylate | — | — | — | — | 20 | — | — | — | — |
| Acrylamide | — | — | — | — | — | 10 | — | — | — |
| Methacrylic acid | — | — | — | — | — | — | 6 | — | — |
| t-Dodecylmercaptan | 0.3 | 0.3 | 0.3 | 0.1 | 0.3 | 0.3 | 0.3 | 0.3 | 0.3 |
| Sodium dodecylbenzene-sulfonate | 2.0 | 2.0 | 2.0 | 2.0 | 2.0 | 2.0 | 2.0 | 2.0 | 2.0 |
| Deionized water | 250 | 250 | 250 | 400 | 250 | 400 | 250 | 250 | 250 |
| Methyl methacrylate | — | — | — | — | — | — | — | 2 | — |
| n-Butyl methacrylate | — | — | — | — | — | — | — | 2 | — |

REFERENCE EXAMPLE 3

(Preparation of rubber-modified styrene polymer G-3)

A 65-liter stainless steel reactor provided with a paddle type stirrer was purged with a nitrogen gas. Thereinto were charged 24 parts of an EPDM (JSR EP 24 manufactured by Japan Synthetic Rubber Co., Ltd.) having an iodine value of 15, a Mooney viscosity of 65 and a propylene content of 43% and containing ethylidenenorbornene as a diene component, 56 parts of styrene, 20 parts of acrylonitrile and 100 parts of toluene. The mixture was stirred at 50° C. until the rubber dissolved completely. Then, there were added 0.1 part of t-dodecylmercaptan, 0.2 part of dibenzoyl peroxide, 0.2 part of t-butylperoxy-1-propyl carbonate and 0.1 part of dicumyl peroxide. Thereafter, they were subjected to polymerization at 80° C. for 3 hours, at 100° C. for 3 hours and at 125° C. for 3 hours in this order (total 9 hours).

The unreacted monomers and the solvent were removed by steam distillation. The residue was ground and dried to obtain a polymer.

EXAMPLES 1-13 AND COMPARATIVE EXAMPLES 1-8

There were used, as the rubber-modified styrene resin (B), the rubber-modified styrene polymers G-1 and G-2 obtained in Reference Example 1, the styrene polymers M-1 to M-7 obtained in Reference Example 2, the rubber-modified styrene polymer G-3 obtained in Reference Example 3, G-4 (Toporex HI 800 manufactured by Mitsui Toatsu Chemicals, Inc.) and a styrene-acrylonitrile copolymer resin (AS resin) (AS-240 manufactured by Japan Synthetic Rubber Co., Ltd. having a bound acrylonitrile content of 24.5% and [0]in methyl ethyl ketone at 30° C. of 0.60) and, as the polyamide elastomer (A), PAE-A (PEBAX 4011 manufactured by Atochem Co. comprising a polyethylene glycol as a polyether component), PAE-B (PEBAX 5533 manufactured by Atochem Co. comprising tetramethylene glycol as a polyether component) and PA-A (Capron 8200, a trade name of Allied Chemical Corp. for nylon 6). These components were mixed with the compounding recipe shown in Table 3, using a Henschel mixer.

Each of the resulting mixtures was passed through a 50-mmφ twin-screw vented extruder at 230° C. for pelletization. The resulting pellets were dried at 90° C., subjected to injection molding at 230° C., then measured for the physical properties shown in Table 3.

A test piece for evaluation of thermal stability of Izod impact strength or gloss was prepared as follows: Using an injection machine, a test piece was firstly prepared at a molding temperature of 230° C. in a 1-minute cycle for evaluation of Izod impact strength or gloss. Then, this test piece was fed into the cyclinder, allowed to stand (reside) for 10 minutes as it was, and molded in a 1-minute cycle to obtain an "after residence" test piece.

A test piece for evaluation of thermal stability of antistatic property was prepared as follows. Using an injection machine, a disc of 100 mm in diameter and 2 mm in thickness was prepared at molding temperature of 230° C. or 270° C. in a 1-minute molding cycle.

The physical properties shown in Table 3 were measured in accordance with the following methods:

Melt flow rate was measured by ASTM D 1238 (220° C).

Heat distortion temperature was measured by ASTM D 648 (load: 18.6 kg/cm$^2$, no annealing).

Izod impact strength was measured by ASTM D 256 (notched).

Gloss was measured by ASTM D 523 (3 mm thickness).

Antistatic property was evaluated by measuring the surface resistivity. That is, the disc prepared above at 230° C. or 270° C. was molded at a relative humidity of 50% at an environmental temperature of 23° C., and the molded article was subjected to 24-hour conditioning and then measured for surface resistivity using an ultra-insulation resistance meter (4329 Type manufactured by Yokokawa-Hewlett Packard Co.). Also, the disc prepared at 230° C. was allowed to stand, after the completion of the above measurement, at a relative humidity of 50% at an environmental temperature of 23° C. for one month, washed with a solvent to remove the water present on the surface, subjected again to 24-hour conditioning, and then measured for surface resistivity in the same manner.

As is clear from Table 3, the thermoplastic resin compositions of Examples 1-13 are those of this invention and all superior in heat stability during molding, mechanical properties, moldability and antistatic property, as aimed at in this invention.

Meanwhile, the thermoplastic resin composition of Comparative Example 1 comprising no polyamide elastomer (A) is outside the scope of this invention and inferior in antistatic property and moldability. The thermoplastic resin composition of Comparative Example 2 comprises a rubber-moldified thermoplastic styrene resin containing no hydroxyl group-containing alkenyl monomer and is inferior in impact resistance.

The thermoplastic resin composition of Comparative Example 3 comprises a rubber-modified thermoplastic styrene resin in an amount larger than required in this invention and is inferior in moldability and antistatic property.

The composition of Comparative Example 4 comprises a rubber-modified thermoplastic styrene resin in an amount smaller than required in this invention and is rubbery and not a resin. The thermoplastic resin composition of Comparative Example 5 uses a carboxyl group-containing alkenyl monomer in place of the hydroxyl group-containing alkenyl monomer and is inferior in heat stability.

The thermoplastic resin composition of Comparative Example 6 uses acrylamide in place of the hydroxyl group-containing alkenyl monomer and is inferior in heat stability. The thermoplastic resin compositions of Comparative Examples 7 and 8 use a polyamide resin (nylon) in place of the polyamide alastomer and are inferior in antistatic property.

TABLE 3

| | Example | | | | | | |
|---|---|---|---|---|---|---|---|
| | 1 | 2 | 3 | 4 | 5 | 6 | 7 |
| Compounding recipe (parts) | | | | | | | |
| (B) (a) Component | | | | | | | |
| Rubber-modified styrene polymer | | | | | | | |
| G-1 | 30 | 30 | 30 | 30 | — | 30 | 30 |
| G-2 | — | — | — | — | — | — | — |
| G-3 | — | — | — | — | 30 | — | — |
| G-4 | — | — | — | — | — | — | — |
| (C) Component | | | | | | | |
| Styrene polymer | | | | | | | |
| M-1 | — | 10 | — | — | — | — | 10 |
| M-2 | — | — | 10 | — | — | — | — |
| M-3 | 1 | — | — | 10 | — | — | — |
| M-4 | — | — | — | — | 1 | 1 | — |
| M-5 | — | — | — | — | — | — | — |
| M-8 | — | — | — | — | — | — | — |
| M-9 | — | — | — | — | — | — | — |
| AS resin AS-240 | 57 | 48 | 48 | 48 | 64 | 59 | 35 |
| (A) Component | | | | | | | |
| PAE-A | 12 | 12 | 12 | 12 | 5 | 10 | 25 |
| PAE-B | — | — | — | — | — | — | — |
| PA-A | — | — | — | — | — | — | — |
| Proportion of each component in composition (%) | | | | | | | |
| (B) and (C) components | 88 | 88 | 88 | 88 | 95 | 90 | 75 |
| (A) Component | 12 | 12 | 12 | 12 | 5 | 10 | 25 |
| Hydroxyl or other functional group-containing alkenyl monomer | 0.2 | 0.5 | 1.0 | 2.0 | 0.5 | 0.5 | 0.5 |
| Physical properties | | | | | | | |
| Melt flow rate (g/10 min) | 32 | 26 | 27 | 19 | 17 | 22 | 25 |
| Heat distortion temperature (°C.) | 95 | 94 | 93 | 93 | 96 | 94 | 84 |
| Izod impact strength (notched) (Kg · cm/cm) | 25 | 31 | 36 | 40 | 14 | 29 | 50 |

TABLE 3-continued

| | | | | | | | |
|---|---|---|---|---|---|---|---|
| Izod impact strength (after residence, 230° C. × 10 min) (Kg·cm/cm) | 19 | 23 | 25 | 26 | 11 | 2 | 35 |
| Retention of impact strength after residence (%) | 76 | 74 | 70 | 65 | 79 | 74 | 70 |
| Gloss (%) | 88 | 87 | 87 | 86 | 91 | 89 | 87 |
| Gloss (after residence, 230° C. × 10 min) (%) | 83 | 82 | 81 | 76 | 85 | 83 | 81 |
| Retention of gloss after residence (%) | 94 | 94 | 93 | 88 | 93 | 93 | 93 |
| Surface resistivity (230° C.) (Ω) | $3 \times 10^{10}$ | $1 \times 10^{10}$ | $1 \times 10^{10}$ | $1 \times 10^{10}$ | $3 \times 10^{12}$ | $2 \times 10^{10}$ | $1 \times 10^{10}$ |
| Surface resistivity (after being allowed to stand for one month and subsequently washed) (Ω) | $3 \times 10^{10}$ | $1 \times 10^{10}$ | $1 \times 10^{10}$ | $1 \times 10^{10}$ | $8 \times 10^{12}$ | $2 \times 10^{10}$ | $1 \times 10^{10}$ |
| Surface resistivity (270° C.) (Ω) | $3 \times 10^{10}$ | $1 \times 10^{10}$ | $1 \times 10^{10}$ | $2 \times 10^{10}$ | $4 \times 10^{12}$ | $2 \times 10^{10}$ | $2 \times 10^{10}$ |

| | 8 | 9 | 10 | 11 | 12 | 13 |
|---|---|---|---|---|---|---|
| Compounding recipe (parts) | | | | | | |
| (B) (a) Component | | | | | | |
| Rubber-modified styrene polymer | | | | | | |
| G-1 | 30 | 30 | — | 30 | 28 | — |
| G-2 | — | — | 30 | — | — | — |
| G-3 | — | — | — | — | — | — |
| G-4 | — | — | — | — | — | 78 |
| (C) Component | | | | | | |
| Styrene polymer | | | | | | |
| M-1 | 10 | 10 | — | 10 | — | — |
| M-2 | — | — | — | — | — | — |
| M-3 | — | — | — | — | — | — |
| M-4 | — | — | — | — | — | — |
| M-5 | — | — | 10 | — | — | — |
| M-8 | — | — | — | — | 5 | — |
| M-9 | — | — | — | — | — | 10 |
| AS resin AS-240 | 20 | 48 | 48 | 48 | 55 | — |
| (A) Component | | | | | | |
| PAE-A | 40 | 12 | 12 | — | 12 | 12 |
| PAE-B | — | — | — | 12 | — | — |
| PA-A | — | — | — | — | — | — |
| Proportion of each component in composition (%) | | | | | | |
| (B) and (C) components | 60 | 88 | 88 | 88 | 88 | 88 |
| (A) Component | 40 | 12 | 12 | 12 | 12 | 12 |
| Hydroxyl or other functional group-containing alkenyl monomer | 0.5 | 0.5 | 0.5 | 0.5 | 0.5 | 2.0 |
| Physical properties | | | | | | |
| Melt flow rate (g/10 min) | 30 | 27 | 26 | 26 | 28 | 70 |
| Heat distortion temperature (°C.) | 78 | 93 | 94 | 93 | 93 | 72 |
| Izod impact strength (notched) (Kg·cm/cm) | 55 | 30 | 32 | 34 | 32 | 8 |
| Izod impact strength (after residence, 230° C. × 10 min) (Kg·cm/cm) | 39 | 23 | 24 | 25 | 23 | 5 |
| Retention of impact strength after residence (%) | 71 | 77 | 75 | 74 | 72 | 63 |
| Gloss (%) | 84 | 87 | 87 | 87 | 86 | 70 |
| Gloss (after residence, 230° C. × 10 min) (%) | 79 | 81 | 81 | 83 | 81 | 65 |
| Retention of gloss after residence (%) | 94 | 93 | 93 | 95 | 94 | 93 |
| Surface resistivity (230° C.) (Ω) | $1 \times 10^{10}$ | $1 \times 10^{10}$ | $1 \times 10^{10}$ | $2 \times 10^{12}$ | $1 \times 10^{10}$ | $1 \times 10^{11}$ |
| Surface resistivity (after being allowed to stand for one month and subsequently washed) (Ω) | $1 \times 10^{10}$ | $1 \times 10^{10}$ | $1 \times 10^{10}$ | $2 \times 10^{12}$ | $1 \times 10^{10}$ | $1 \times 10^{11}$ |
| Surface resistivity (270° C.) (Ω) | $2 \times 10^{10}$ | $1 \times 10^{10}$ | $1 \times 10^{10}$ | $2 \times 10^{12}$ | $1 \times 10^{10}$ | $1 \times 10^{11}$ |

| | Comparative Example | | | | | | | |
|---|---|---|---|---|---|---|---|---|
| | 1 | 2 | 3 | 4 | 5 | 6 | 7 | 8 |
| Compounding recipe (parts) | | | | | | | | |
| (B) (a) Component | | | | | | | | |
| Rubber-modified styrene polymer | | | | | | | | |
| G-1 | 30 | 30 | 30 | — | 30 | 30 | 30 | 30 |
| G-2 | — | — | — | — | — | — | — | — |
| G-3 | — | — | — | — | — | — | — | — |
| (C) Component | | | | | | | | |
| Styrene polymer | | | | | | | | |
| M-1 | — | — | 10 | — | — | — | 10 | 10 |
| M-2 | — | — | — | 5 | — | — | — | — |
| M-3 | — | — | — | — | — | — | — | — |
| M-4 | — | — | — | — | — | — | — | — |
| M-5 | — | — | — | — | — | — | — | — |
| M-6 | — | — | — | — | — | 5 | — | — |
| M-7 | — | — | — | — | 10 | — | — | — |
| AS resin AS-240 | 70 | 58 | 59.5 | — | 48 | 53 | 48 | 20 |

TABLE 3-continued

| (A) Component | | | | | | | | |
|---|---|---|---|---|---|---|---|---|
| PAE-A | — | 12 | 0.5 | 95 | 12 | 12 | — | — |
| PAE-B | — | — | — | — | — | — | — | — |
| PA-A | — | — | — | — | — | — | 12 | 40 |
| Proportion of each component in composition (%) | | | | | | | | |
| (B) and (C) components | 100 | 88 | 99.5 | 5 | 88 | 88 | 88 | 60 |
| (A) Component | — | 12 | 0.5 | 95 | 12 | 12 | 12 | 40 |
| Hydroxyl or other functional group-containing alkenyl monomer | — | — | 0.5 | 0.5 | 0.5 | 0.5 | 0.5 | 0.5 |
| Physical Properties | | | | | | | | |
| Melt flow rate (g/10 min) | 14 | 22 | 13 | 50 | 25 | 23 | 18 | 28 |
| Heat distortion temperature (°C.) | 94 | 92 | 94 | 50 | 93 | 93 | 95 | 94 |
| Izod impact strength (notched) (Kg · cm/cm) | 24 | 11 | 21 | Not broken | 22 | 16 | 25 | 15 |
| Izod impact strength (after resistance. 230° C. × 10 min) (Kg · cm/cm) | 21 | 8 | 16 | Not broken | 10 | 10 | 18 | 11 |
| Retention of impact strength after residence (%) | 88 | 72 | 76 | 100 | 45 | 63 | 72 | 71 |
| Gloss (%) | 91 | 86 | 87 | 81 | 84 | 85 | 82 | 86 |
| Gloss (after residence. 230° C. × 10 min) (%) | 85 | 80 | 81 | 60 | 32 | 41 | 75 | 72 |
| Retention of gloss after residence (%) | 93 | 93 | 93 | 74 | 38 | 48 | 85 | 84 |
| Surface resistivity (230° C.) (Ω) | $>1 \times 10^{16}$ | $1 \times 10^{13}$ | $>1 \times 10^{16}$ | $6 \times 10^9$ | $8 \times 10^{10}$ | $3 \times 10^{11}$ | $4 \times 10^{14}$ | $2 \times 10^{14}$ |
| Surface resistivity (after being allowed to stand for one month and subsequently washed) (Ω) | $>1 \times 10^{16}$ | $1 \times 10^{13}$ | $>1 \times 10^{16}$ | $1 \times 10^{10}$ | $8 \times 10^{10}$ | $1 \times 10^{10}$ | $1 \times 10^{15}$ | $9 \times 10^{14}$ |
| Surface resistivity (270° C.) (Ω) | $>1 \times 10^{16}$ | $2 \times 10^{13}$ | $>1 \times 10^{16}$ | $2 \times 10^{10}$ | $7 \times 10^{12}$ | $2 \times 10^{10}$ | $1 \times 10^{15}$ | $2 \times 10^{15}$ |

EXAMPLES 14-21 AND COMPARATIVE EXAMPLES 9-15

Preparation of thermoplastic polyurethanes (1)-1: Takelac T-890 (a produce of Takeda Chemical Industries, Ltd.) was used.

(1)-2: Takelac T-155D (a product of Takeda Chemical Industries, Ltd.) was used.

(1)-3: Takelac T-498 (a product of Takeda Chemical Industries, Ltd.) was used.

Preparation of functional group-free styrene resins (2)-1: A graft copolymer composed of 41.5 parts of a polybutadiene, 43.5 parts of styrene and 15 parts of acrylonitrile was obtained according to a conventional emulsion polymerization method.

(2)-2: A graft copolymer composed of 32 parts of an EPDM (EP 82 manufactured by Japan Synthetic Rubber Co., Ltd.), 44 parts of styrene and 24 parts of acrylonitrile was obtained according to a conventional solution polymerization method.

(2)-3: A copolymer composed of 68.5 parts of styrene and 31.5 parts of acrylonitrile was obtained according to a conventional solution polymerization method.

Preparation of functional group-containing styrene resins (2)-4: A graft copolymer composed of 40 parts of a polybutadidne, 42 parts of styrene, 15 parts of acrylonitrile and 3 parts of acrylic acid was obtained according to a conventional emulsion polymerization method.

(2)-5: A copolymer composed of 47 parts of styrene, 25 parts of α-methylstyrene, 18 parts of acrylonitrile and 10 parts of acrylic acid was obtained according to a conventional emulsion polymerization method.

(2)-6: A copolymer composed of 90 parts of methyl methacrylate and 10 parts of maleic anhydride was obtained according to a conventional solution polymerization method.

(2)-7: A copolymer composed of 60 parts of styrene, 20 parts of acrylonitrile and 20 parts of 2-hydroxyethyl acrylate was obtained according to a conventional emulsion polymerization method.

(2)-8: A copolymer composed of 10 parts of a polybutadiene, 63 parts of styrene, 26 parts of acrylonitrile and 1 part of methacrylic acid was obtained according to a conventional emulsion polymerization method.

The above components were mixed using a Henschel mixer with the compounding recipe shown in Table 4. Each of the resulting mixtures was melt-kneaded at 230° C. using a 50-mmφ twin-screw vented extruder to prepare pellets. The pellets were measured for melt flow rate in accordance with JIS K 7210 (220° C., 10 kg).

The above pellets were subjected to injection molding at 230° C. using an injection machine IS-80A (a product of Toshiba Machine Co., Ltd.) to prepare test pieces. The test pieces were measured for Izod impact strength (ASTM D 256, ¼ in. notched. 23° C.), thermal distortion temperature (ASTM D 68, 18.6 kg/cm², ½ in.), flexural modulus of elasticity (ASTM D 790) and tensile strength (ASTM D 638, drawing speed = 15 mm/min).

The above pellets were also treated by an injection machine (IS-25EP, a product of Toshiba Machine Co., Ltd.) at 230° C. to prepare a disc (diameter = 100 mm, thickness = 2 mm). The disc was molded at a relative humidity of 50% at an environmental temperature of 23° C. The molded article was subjected to 24-hour conditioning or allowed to stand for one month and washed with a detergent, and then measured for surface resistivity using an ultra-insulation resistance meter (4329A manufactured by Yokokawa-Hewlett Packard Co.).

As is clear from Table 4, the thermoplastic resin compositions of Examples 14-21 are all those of this invention and are superior in fluidity, heat resistance and mechanical strengths. Further, they have a low surface resistivity which is not much changed with the lapse of time or by surface washing, and thus have excellent antistatic property.

In contrast, in the case of the thermoplastic resin compositions of Comparative Examples 9 and 13 wherein the content of the thermoplastic polyurethane (B)(b)(1) is less than 1%, the Izod impact strength is low; and in the case of the thermoplastic resin compositions of Comparative Examples 10 and 14 wherein the content of the polyamide elastomer (A) is less than 1%, the surface resistivity is high and accordingly the antistatic property is poor.

In the case of the thermoplastic resin compositions of Comparative Examples 11 and 12 wherein a styrene resin was used without being modified with a functional group-containing compound, the Izod impact strength is low.

In the thermoplastic resin compositions of Comparative Example 15 wherein the proportion of the (A) component is less than 1% of the total of the (A) and (B) components, surface resistivity is high, in other words, antistatic property is poor.

TABLE 4

| | Example | | | | | | | |
|---|---|---|---|---|---|---|---|---|
| | 14 | 15 | 16 | 17 | 18 | 19 | 20 | 21 |
| Compounding recipe (Parts) | | | | | | | | |
| (A) Component | | | | | | | | |
| Polyamide elastomer | | | | | | | | |
| PAE-A | 12 | 3 | — | 5 | 5 | 20 | 2 | 40 |
| PAE-B | — | — | 20 | — | — | — | — | — |
| (B) (b) (1) Component | | | | | | | | |
| Thermoplastic polyurethane | | | | | | | | |
| (1)-1 | 3 | 12 | — | 5 | — | — | 40 | 5 |
| (1)-2 | — | — | 1 | — | — | 40 | — | — |
| (1)-3 | — | — | — | — | 1 | — | — | — |
| (B) (b) (2) Component | | | | | | | | |
| Functional group-free styrene resin | | | | | | | | |
| (2)-1 | 28 | 28 | 25 | — | 40 | — | — | — |
| (2)-2 | — | — | — | 40 | — | — | — | — |
| (2)-3 | 55 | 55 | 50 | 55 | 50 | 36 | 53 | — |
| Functional group-containing styrene resin | | | | | | | | |
| (2)-4 | 2 | 2 | — | — | — | 4 | — | — |
| (2)-5 | — | — | 4 | — | — | — | — | — |
| (2)-6 | — | — | — | 5 | — | — | — | — |
| (2)-7 | — | — | — | — | 6 | — | 5 | — |
| (2)-8 | — | — | — | — | — | — | — | 55 |
| Physical Properties | | | | | | | | |
| Melt flow rate (g/10 min) | 24 | 26 | 23 | 35 | 12 | 60 | 55 | 60 |
| Izod impact strength (Kg · cm/cm) | 37 | 46 | 52 | 35 | 29 | Not broken | Not broken | Not broken |
| Heat distortion temperature (°C.) | 92 | 92 | 90 | 93 | 94 | 70 | 85 | 85 |
| Flexural modulus (Kg/cm²) | 25,000 | 25,000 | 23,000 | 25,000 | 26,000 | 1,100 | 18,000 | 16,000 |
| Tensile strength (Kg/cm²) | 420 | 430 | 400 | 450 | 460 | 220 | 300 | 250 |
| Surface resistivity (Ω) | | | | | | | | |
| After one day | $1 \times 10^{10}$ | $2 \times 10^{12}$ | $8 \times 10^{11}$ | $1 \times 10^{12}$ | $2 \times 10^{12}$ | $1 \times 10^{9}$ | $9 \times 10^{11}$ | $1 \times 10^{9}$ |
| After being allowed to stand for one month and subsequently washed | $1 \times 10^{10}$ | $3 \times 10^{12}$ | $9 \times 10^{11}$ | $1 \times 10^{12}$ | $3 \times 10^{12}$ | $1 \times 10^{9}$ | $8 \times 10^{11}$ | $1 \times 10^{9}$ |

| | Comparative Example | | | | | | |
|---|---|---|---|---|---|---|---|
| | 9 | 10 | 11 | 12 | 13 | 14 | 15 |
| Compounding recipe (Parts) | | | | | | | |
| (A) Component | | | | | | | |
| Polyamide elastomer | | | | | | | |
| PAE-A | 15 | — | — | 12 | — | 0.3 | 0.4 |
| PAE-B | — | — | 20 | — | 20 | — | — |
| (B) (b) (1) Component | | | | | | | |
| Thermoplastic polyurethane | | | | | | | |
| (1)-1 | — | 15 | — | 3 | — | 41.7 | 0.4 |
| (1)-2 | — | — | 1 | — | 0.1 | — | — |
| (1)-3 | — | — | — | — | — | — | — |
| (B) (b) (2) Component | | | | | | | |
| Functional group-free styrene resin | | | | | | | |
| (2)-1 | 28 | 28 | 25 | — | 26 | — | 34 |
| (2)-2 | — | — | — | 35 | — | — | — |
| (2)-3 | 55 | 55 | 54 | 50 | 50 | 53 | 60 |
| Functional group-containing styrene resin | | | | | | | |
| (2)-4 | 2 | 2 | — | — | — | — | — |
| (2)-5 | — | — | — | — | 4 | — | — |
| (2)-6 | — | — | — | — | — | — | 6 |
| (2)-7 | — | — | — | — | — | 5 | — |
| (2)-8 | — | — | — | — | — | — | — |
| Physical Properties | | | | | | | |
| Melt flow rate (g/10 min) | 21 | 25 | 25 | 32 | 31 | 56 | 16 |
| Izod impact strength (Kg · cm/cm) | 18 | 40 | 11 | 12 | 22 | Not broken | 35 |

TABLE 4-continued

| | | | | | | | |
|---|---|---|---|---|---|---|---|
| Heat distortion temperature (°C.) | 92 | 92 | 90 | 92 | 90 | 85 | 93 |
| Flexural modulus (Kg/cm²) | 25,000 | 25,000 | 23,000 | 25,000 | 23,000 | 18,000 | 28,000 |
| Tensile strength (Kg/cm²) | 400 | 400 | 380 | 410 | 390 | 380 | 450 |
| Surface resistivity (Ω) | | | | | | | |
| After one day | $1 \times 10^{10}$ | $6 \times 10^{14}$ | $6 \times 10^{12}$ | $3 \times 10^{11}$ | $7 \times 10^{12}$ | $1 \times 10^{13}$ | $>1 \times 10^{16}$ |
| After being allowed to stand for one month and subsequently washed | $1 \times 10^{10}$ | $9 \times 10^{14}$ | $7 \times 10^{12}$ | $3 \times 10^{11}$ | $7 \times 10^{12}$ | $2 \times 10^{13}$ | $>1 \times 10^{16}$ |

EXAMPLES 22–34 AND COMPARATIVE EXAMPLES 16–25

The above-mentioned (1) components and the above-mentioned (2) components were mixed using a mixer with the compounding recipe shown in Table 5. Each of the resulting mixtures was melt kneaded at 200° C. using an extruder to give rise to crosslinking reaction, thereby obtaining reaction products (b-1) to

TABLE 5

| Compounding recipe (parts) | b-1 | b-2 | b-3 | b-4 | b-5 | b-6 |
|---|---|---|---|---|---|---|
| (1)-1 | 50 | 50 | 50 | — | — | 80 |
| (1)-2 | — | — | — | 50 | — | — |
| (1)-3 | — | — | — | — | 50 | — |
| (2)-4 | 50 | — | — | 50 | 50 | 20 |
| (2)-5 | — | 50 | — | — | — | — |
| (2)-6 | — | — | 50 | — | — | — |

Each of the reaction products was mixed with other components using a Henschel mixer with the compounding recipe shown in Table 6.

Each of the resulting mixtures was melt-kneaded at 230° C. using a 50-mmφ twin screw vented extruder to prepare pellets. The pellets were measured for melt flow rate in accordance with JIS K 7210 (220° C., 10 kg).

The above pellets were subjected to injection molding at 230° C. using an injection machine IS-80A (a product of Toshiba Machine Co., Ltd.) to prepare test pieces. The test pieces were measured for Izod impact strength (ASTM D 256, ¼ in. notched, 23° C.), thermal distortion temperature (ASTM D 68, 18.6 kg/cm², ½ in.), flexural modulus (ASTM D 790) and tensile strength (ASTM D 638, drawing speed = 15 mm/min).

The above pellets were also treated by an injection machine (IS-25EP, a product of Toshiba Machine Co., Ltd.) at 230° C. to prepare a disc (diameter = 100 mm, thickness = 2 mm). The disc was molded at a relative humidity of 50% at an environmental temperature of 23° C. The molded article was subjected to 24-hour conditioning or allowed to stand for one month and washed with a detergent, and then measured for surface resistivity using an ultra-insulation resistance meter (4329A manufactured by Yokokawa-Hewlett Packard Co.). Using the same test piece, surface appearance was evaluated visually. The evaluation criteria were ◯ (good), Δ (slightly poor) and X (very poor).

As is clear from Table 6, the thermoplastic resin compositions of Examples 22–34 are all those of this invention and are superior in fluidity, heat resistance, mechanical strengths and surface appearance. Further, they have a low surface resistivity which is not much changed with the lapse of time or by surface washing, and thus have excellent antistatic property.

In contrast, in the case of the thermoplastic resin compositions of Comparative Examples 16, 18 and 22 wherein the content of the reaction product of a thermoplastic polyurethane (1) and a functional group-containing styrene resin (2) is less than 0.1 part, the Izod impact strength is low and the surface resistivity is high (the antistatic property is poor).

In the case of the thermoplastic resin compositions of Comparative Examples 19–22 in which only a functional group-containing styrene resin (B)(b)(1) is used as the (B) component, the impact resistance and the surface appearance are poor.

In the case of the thermoplastic resin compositions of Comparative Examples 23 and 25 wherein the content of polyamide elastomer (A) is less than 1% by weight, the surface resistivity is high (no antistatic property). In the case of the thermoplastic resin composition of Comparative Example 24 wherein said content is more than 90% by weight, the flexural modulus of elasticity is low.

TABLE 6

| | Example | | | | | | |
|---|---|---|---|---|---|---|---|
| | 22 | 23 | 24 | 25 | 26 | 27 | 28 |
| Compounding recipe (Parts) | | | | | | | |
| (A) Component | | | | | | | |
| Polyamide elastomer | | | | | | | |
| PAE-A | 13 | — | 13 | 13 | 13 | 13 | 5 |
| PAE-B | — | 13 | — | — | — | — | — |
| (C) Component | | | | | | | |
| Styrene resin | | | | | | | |
| (2)-1 | 30 | 30 | — | 30 | 30 | 30 | 46 |
| (2)-2 | — | — | 38 | — | — | — | — |
| (2)-3 | 57 | 57 | 49 | 57 | 57 | 57 | 49 |
| (B) (b) Component | | | | | | | |
| Reaction product | | | | | | | |
| b-1 | 5 | 5 | 5 | 1 | 10 | 30 | 5 |
| b-2 | — | — | — | — | — | — | — |
| b-3 | — | — | — | — | — | — | — |
| b-4 | — | — | — | — | — | — | — |
| b-5 | — | — | — | — | — | — | — |
| b-6 | — | — | — | — | — | — | — |
| Physical properties | | | | | | | |
| Melt flow rate (g/10 min) | 22 | 15 | 32 | 23 | 23 | 24 | 19 |

TABLE 6-continued

| | | | | | | | |
|---|---|---|---|---|---|---|---|
| Izod impact strength (Kg · cm/cm) | 36 | 45 | 36 | 20 | 45 | 60 | 38 |
| Heat distortion temperature (°C.) | 91 | 91 | 91 | 93 | 90 | 82 | 92 |
| Flexural modulus (Kg/cm$^2$) | 25,000 | 25,000 | 25,000 | 25,000 | 24,000 | 19,000 | 28,000 |
| Tensile strength (Kg/cm$^2$) | 420 | 400 | 420 | 400 | 430 | 380 | 520 |
| Surface resistivity (after one day) (Ω) | $1 \times 10^{10}$ | $8 \times 10^{11}$ | $1 \times 10^{10}$ | $5 \times 10^{10}$ | $1 \times 10^{10}$ | $1 \times 10^{10}$ | $8 \times 10^{11}$ |
| Surface resistivity (after being allowed to stand for one month and subsequently washed) (Ω) | $1 \times 10^{10}$ | $1 \times 10^{12}$ | $1 \times 10^{10}$ | $5 \times 10^{10}$ | $2 \times 10^{10}$ | $3 \times 10^{10}$ | $9 \times 10^{11}$ |
| Appearance (visual checking) | ○ | ○ | ○ | ○ | ○ | ○ | ○ |

| | 29 | 30 | 31 | 32 | 33 | 34 |
|---|---|---|---|---|---|---|
| Compounding recipe (Parts) | | | | | | |
| (A) Component | | | | | | |
| *Polyamide elastomer* | | | | | | |
| PAE-A | 30 | 13 | 13 | 13 | 13 | 13 |
| PAE-B | — | — | — | — | — | — |
| (C) Component | | | | | | |
| *Styrene resin* | | | | | | |
| (2)-1 | 10 | 30 | 30 | 30 | 30 | 30 |
| (2)-2 | — | — | — | — | — | — |
| (2)-3 | 60 | 57 | 57 | 57 | 57 | 57 |
| (B) (b) Component | | | | | | |
| *Reaction product* | | | | | | |
| b-1 | 5 | — | — | — | — | — |
| b-2 | — | 5 | — | — | — | — |
| b-3 | — | — | 5 | — | — | — |
| b-4 | — | — | — | 5 | — | — |
| b-5 | — | — | — | — | 5 | — |
| b-6 | — | — | — | — | — | 5 |
| Physical properties | | | | | | |
| Melt flow rate (g/10 min) | 32 | 18 | 21 | 21 | 22 | 24 |
| Izod impact strength (Kg · cm/cm) | 25 | 24 | 33 | 24 | 21 | 38 |
| Heat distortion temperature (°C.) | 88 | 91 | 91 | 90 | 89 | 90 |
| Flexural modulus (Kg/cm$^2$) | 16,000 | 25,000 | 25,000 | 25,000 | 25,000 | 25,000 |
| Tensile strength (Kg/cm$^2$) | 250 | 410 | 420 | 440 | 410 | 400 |
| Surface resistivity (after one day) (Ω) | $6 \times 10^{9}$ | $1 \times 10^{10}$ | $1 \times 10^{10}$ | $3 \times 10^{10}$ | $5 \times 10^{10}$ | $1 \times 10^{10}$ |
| Surface resistivity (after being allowed to stand for one month and subsequently washed) (Ω) | $5 \times 10^{9}$ | $2 \times 10^{10}$ | $1 \times 10^{10}$ | $3 \times 10^{10}$ | $6 \times 10^{10}$ | $2 \times 10^{10}$ |
| Appearance (visual checking) | ○ | ○ | ○ | ○ | ○ | ○ |

| | Comparative Example | | | | |
|---|---|---|---|---|---|
| | 16 | 17 | 18 | 19 | 20 |
| Compounding recipe (Parts) | | | | | |
| (A) Polyamide elastomer | | | | | |
| PAE-E | 12 | — | 12 | 12 | 12 |
| PAE-B | — | 12 | — | — | — |
| (C) Styrene resin | | | | | |
| (2)-1 | 30 | 30 | — | 26 | 26 |
| (2)-2 | — | — | 38 | — | — |
| (2)-3 | 58 | 58 | 50 | 58 | 58 |
| (B) (b) Reaction product b-3 | — | — | — | — | — |
| (B) (b) (2) Functional group-containing styrene resin | | | | | |
| (2)-4 | — | — | — | 4 | 8 |
| (2)-5 | — | — | — | — | — |
| Physical properties | | | | | |
| Melt flow rate (g/10 min) | 22 | 13 | 34 | 19 | 16 |
| Izod impact resistance (Kg · cm/cm) | 13 | 20 | 12 | 17 | 14 |
| Heat distortion temperature (°C.) | 92 | 94 | 93 | 93 | 93 |
| Flexural modulus (Kg/cm$^2$) | 25,000 | 25,000 | 25,000 | 25,000 | 25,000 |
| Tensile strength (Kg/cm$^2$) | 400 | 400 | 400 | 410 | 420 |
| Surface resistivity (after one day) (Ω) | $1 \times 10^{12}$ | $8 \times 10^{13}$ | $2 \times 10^{12}$ | $2 \times 10^{10}$ | $2 \times 10^{10}$ |
| Surface resistivity (after being allowed to stand for one month and subsequently washed) (Ω) | $1 \times 10^{12}$ | $9 \times 10^{13}$ | $3 \times 10^{12}$ | $2 \times 10^{10}$ | $2 \times 10^{10}$ |
| Appearance (visual checking) | ○ | ○ | ○ | Δ silver | X Silver Delustering |

| | 21 | 22 | 23 | 24 | 25 |
|---|---|---|---|---|---|
| Compounding recipe (Parts) | | | | | |
| (A) Polyamide elastomer | | | | | |
| PAE-E | 12 | 13 | 0.5 | 95 | — |
| PAE-B | — | — | — | — | — |
| (C) Styrene resin | | | | | |
| (2)-1 | 30 | 30 | 34 | — | 34 |
| (2)-2 | — | — | — | — | — |

TABLE 6-continued

| | | | | | |
|---|---|---|---|---|---|
| (2)-3 | 54 | 57 | 65.5 | 5 | 66 |
| (B) (b) Reaction product b-3 | — | 0.05 | 5 | 5 | — |
| (B) (b) (2) Functional group-containing styrene resin | | | | | |
| (2)-4 | — | — | — | — | — |
| (2)-5 | 4 | — | — | — | — |
| Physical properties | | | | | |
| Melt flow rate (g/10 min) | 10 | 22 | 14 | 65 | 14 |
| Izod impact resistance (Kg · cm/cm) | 16 | 13 | 36 | Not broken | 34 |
| Heat distortion temperature (°C.) | 93 | 93 | 93 | 45 | 93 |
| Flexural modulus (Kg/cm$^2$) | 25,000 | 25,000 | 29,000 | 3,000 | 29,000 |
| Tensile strength (Kg/cm$^2$) | 420 | 400 | 400 | 130 | 410 |
| Surface resistivity (after one day) (Ω) | $2 \times 10^{10}$ | $2 \times 10^{12}$ | $>1 \times 10^{16}$ | $6 \times 10^9$ | $>1 \times 10^{16}$ |
| Surface resistivity (after being allowed to stand for one month and subsequently washed) (Ω) | $3 \times 10^{10}$ | $3 \times 10^{12}$ | $>1 \times 10^{16}$ | $5 \times 10^9$ | $>1 \times 10^{16}$ |
| Appearance (visual checking) | X Silver Delustering | ○ | ○ | ○ | ○ |

What is claimed is:

1. A thermoplastic resin composition comprising:
   (A) 1-90% by weight of a polyamide elastomer composed of (X) a hard segment and (Y) a soft segment in which the proportion of the (X) component is 10-95% by weight and
   (B) 99-10% by weight of a rubber-modified thermoplastic styrene resin consisting of a rubber-modified styrene polymer containing a hydroxyl group-containing alkenyl monomer as a copolymerized component or a mixture of a rubber-modified styrene polymer with a rubber unmodified styrene polymer, in which mixture at least one of these polymers contains a hydroxyl group-containing alkenyl monomer as a copolymerized component.

2. The thermoplastic resin composition according to claim 1, wherein the polyamide elastomer (A) is a polyetheresteramide which is composed of (i) an aminocarboxylic acid or lactam having 6 or more carbon atoms, or a nylon mn salt in which m+n is 12 or more, (ii) a poly(ethylene oxide) glycol having a number-average molecular weight of 200-6,000 and (iii) a dicarboxylic acid having 4-20 carbon atoms and which contains a polyetherester unit in an amount of 5-90% by weight.

3. The thermoplastic resin composition according to claim 18, wherein the (B) component is (a) a rubber-modified styrene thermoplastic resin which contains a hydroxyl group-containing alkenyl monomer as a copolymerized component in an amount of 0.01-15% by weight.

4. The thermoplastic resin composition according to claim 1, wherein said polyamide elastomer is composed of (X) a hard segment which is an aminocarboxylic acid or a lactam having 6 or more carbon atoms or a nylon mn salt in which m+n is 12 or more and (Y) a soft segment which is a polyol, in which elastomer the proportion of the (X) component is 10-95% by weight.

5. A thermoplastic resin composition comprising (A) 1-90% by weight of a polyamide elastomer composed of (X) a hard segment and (Y) a soft segment, in which the proportion of (X) is 10-95% by weight, and (B) 99-10% by weight of a mixture of a rubber-modified styrene polymer with a rubber unmodified styrene polymer in which mixture at least one of these polymers contains a hydroxyl group-containing alkenyl monomer as a copolymerized monomer.

* * * * *